(12) United States Patent
Urayama et al.

(10) Patent No.: US 9,547,743 B2
(45) Date of Patent: Jan. 17, 2017

(54) MANUFACTURING METHOD FOR A SEMICONDUCTOR DEVICE, PATTERN GENERATING METHOD AND NONTRANSITORY COMPUTER READABLE MEDIUM STORING A PATTERN GENERATING PROGRAM

(71) Applicant: Kabushiki Kaisha Toshiba, Minato-ku (JP)

(72) Inventors: Takuro Urayama, Mie (JP); Yoshihiro Yanai, Yokkaichi (JP); Seiro Miyoshi, Yokkaichi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/731,623

(22) Filed: Jun. 5, 2015

(65) Prior Publication Data

US 2016/0247679 A1    Aug. 25, 2016

Related U.S. Application Data

(60) Provisional application No. 62/120,623, filed on Feb. 25, 2015.

(51) Int. Cl.
| | | |
|---|---|---|
| *H01L 21/027* | (2006.01) | |
| *G06F 17/50* | (2006.01) | |
| *H01L 29/66* | (2006.01) | |
| *H01L 27/115* | (2006.01) | |
| *H01L 21/02* | (2006.01) | |
| *H01L 21/3105* | (2006.01) | |

(52) U.S. Cl.
CPC ....... *G06F 17/5081* (2013.01); *H01L 21/0274* (2013.01); *H01L 21/02345* (2013.01); *H01L 21/31055* (2013.01); *H01L 27/11568* (2013.01); *H01L 27/11582* (2013.01); *H01L 29/66833* (2013.01)

(58) Field of Classification Search
CPC .................. H01L 21/02296; H01L 21/02436
See application file for complete search history.

(56) References Cited

U.S. PATENT DOCUMENTS

| | | | |
|---|---|---|---|
| 6,655,024 B2 | 12/2003 | Suzuki et al. | |
| 2015/0140825 A1* | 5/2015 | deVilliers | H01L 21/0276 438/703 |

FOREIGN PATENT DOCUMENTS

| | | |
|---|---|---|
| JP | 2002-353160 | 12/2002 |
| JP | 2004-303815 | 10/2004 |
| JP | 2011-2649 | 1/2011 |

* cited by examiner

*Primary Examiner* — Cheung Lee
(74) *Attorney, Agent, or Firm* — Oblon, McClelland, Maier & Neustadt, L.L.P.

(57) ABSTRACT

According to one embodiment, stepped structure is formed on a semiconductor substrate, a processing film is formed to cover the stepped structure, a resist film is formed on the processing film in such a manner as to be thinner at a higher portion of the stepped structure than at a lower portion of the same, and the resist film and the processing film are etched to flatten the processing film.

8 Claims, 10 Drawing Sheets

| GAS TYPE G | G0 | G1 | G2 | G3 | G4 |
|---|---|---|---|---|---|
| RESIST ETCH RATE X | X1 | X2 | X3 | X4 | X4 |
| PROCESSED FILM ETCH RATE Y | Y1 | Y1 | Y1 | Y2 | Y2 |

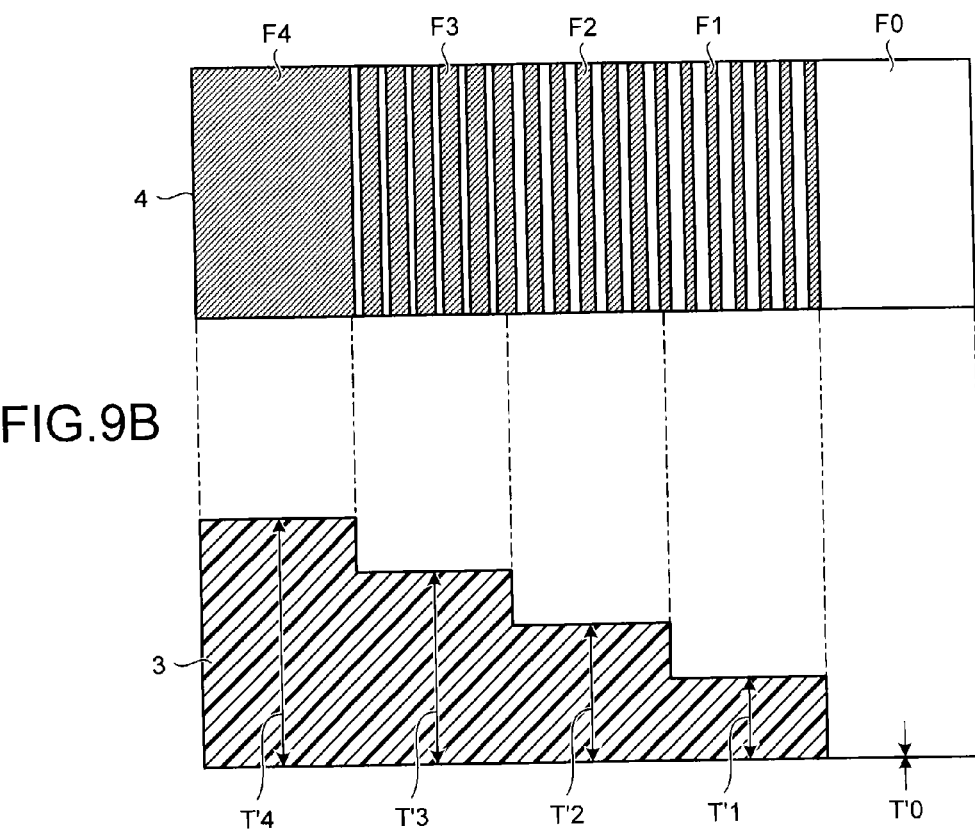

| POSITION P | P0 | P1 | P2 | P3 | P4 |
|---|---|---|---|---|---|
| RESIDUAL RESIST FILM T | T0 | T1 | T2 | T3 | T4 |
| FOUNDATION STEP D | D0 | D1 | D2 | D3 | D4 |

MANUFACTURING METHOD FOR A SEMICONDUCTOR DEVICE, PATTERN GENERATING METHOD AND NONTRANSITORY COMPUTER READABLE MEDIUM STORING A PATTERN GENERATING PROGRAM

CROSS-REFERENCE TO RELATED APPLICATIONS

This application is based upon and claims the benefit of priority from U.S. Provisional Application No. 62/120,623, filed on Feb. 25, 2015; the entire contents of which are incorporated herein by reference.

FIELD

Embodiments described herein relate generally to a manufacturing method for a semiconductor device, a pattern generating method, and a nontransitory computer readable medium storing a pattern generating program.

BACKGROUND

In a process for manufacturing a semiconductor, chemical mechanical polish (CMP) may be used to flatten steps. However, the CMP may cause dishing depending on heights or positions of the steps, thereby resulting in insufficient flatness.

BRIEF DESCRIPTION OF THE DRAWINGS

FIG. 9A is a diagram illustrating an example of residual film information in FIG. 7, and FIG. 9B is a diagram illustrating correspondences between light-shielding patterns and residual resist films, providing effective transmission rates in FIG. 9A;

DETAILED DESCRIPTION

In general, according to one embodiment, a stepped structure is formed on a semiconductor substrate, a processing film is formed to cover the stepped structure, a resist film thinner at a higher portion than at a lower portion of the stepped structure is formed on the processing film, and the resist film and the processing film are etched to flatten the processing film.

Exemplary embodiments of a manufacturing method for a semiconductor device and a pattern generating method will be explained below in detail with reference to the accompanying drawings. The present invention is not limited to the following embodiments.

First Embodiment

Figure 1A:
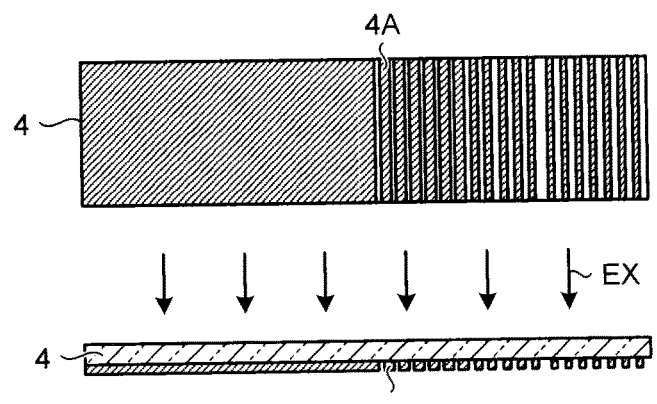
FIG. 1A is a plane view of an exposure mask applied to a manufacturing method for a semiconductor device according to a first embodiment.
Figure 1B:
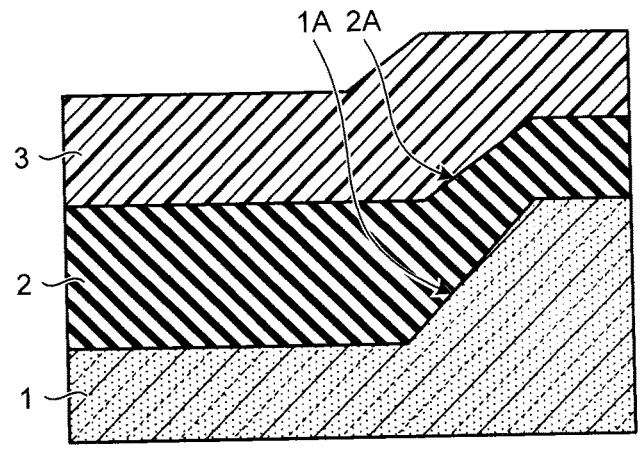
FIGS. 1B to 1D are cross-sectional views illustrating the manufacturing method for a semiconductor device according to the first embodiment.
Figure 1C:
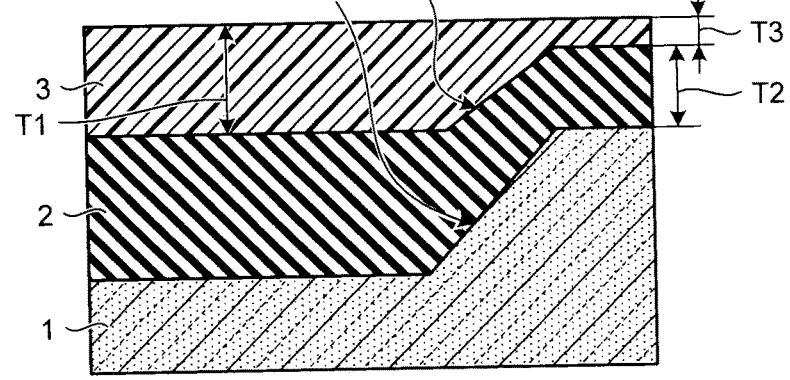
Figure 1D:
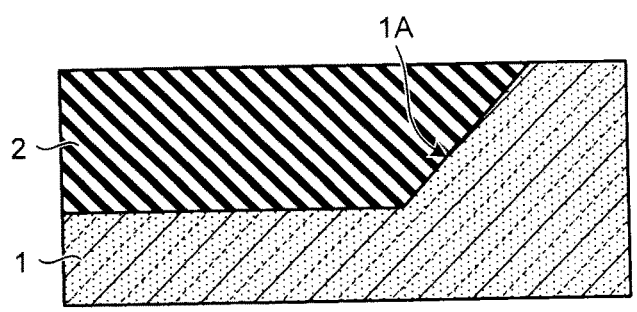

FIG. 1A is a plane view of an exposure mask applied to a manufacturing method for a semiconductor device according to a first embodiment, and FIGS. 1B to 1D are cross-sectional views illustrating the manufacturing method for a semiconductor device according to the first embodiment.

Referring to FIG. 1A, an exposure mask 4 is provided with a light-shielding pattern 4A. The light-shielding pattern 4A is disposed to change the effective transmission rate of the exposure mask 4. The crude density of the light-shielding pattern 4A may be changed according to the effective transmission rate of the exposure mask 4. The crude density of the light-shielding pattern 4A may be provided with a pattern pitch of a resolution limit or less. Alternatively, a hole pattern with differences in hole diameter or hole density may be used to change the crude density of the light-shielding pattern 4A. Alternatively, the film thickness of the light-shielding pattern 4A may be changed, or the light-shielding pattern 4A may be formed from a material with differences in transmission rate to change the effective transmission rate of the exposure mask 4.

As illustrated in FIG. 1B, a stepped structure 1A is provided on a foundation layer 1. The foundation layer 1 may be a semiconductor substrate, a wiring layer, or an insulator. Then, a processing film 2 is formed on the foundation layer 1 by a method such as CVD. At that time, a stepped structure 2A into which the stepped structure 1A on the foundation layer 1 is reflected, is formed on the processing film 2. Next, a resist film 3 is applied to the processing film 2 by a method such as spin coating. Then, the resist film 3 is irradiated with exposure light EX via the exposure mask 4 to provide the resist film 3 with solubility at development. The resist film 3 may be provided with a solubility distribution according to an effective transmission rate distribution of the exposure mask 4. That is, the resist film 3 may be higher in solubility at a portion of the exposure mask 4 with a higher effective transmission rate than at a portion of the exposure mask 4 with a lower effective transmission rate. The exposure mask 4 may be higher in effective transmission rate at a higher portion of the stepped structure 2A than at a lower portion of the same.

Next, as illustrated in FIG. 1C, the resist film 3 is developed to dissolve the resist film 3 according to the solubility distribution of the resist film 3. At that time, the film thickness of the resist film 3 may be thinned at a higher portion of the stepped structure 2A than at a lower portion of the same. When the etch rate of the resist film 3 is designated as X, the etch rate of the processing film 2 as Y, the film thickness of the resist film 3 at the lower portion of the stepped structure 2A as T1, the film thickness of the processing film 2 at the higher portion of the stepped structure 2A as T2, and the film thickness of the resist film 3 at the higher portion of the stepped structure 2A as T3, the relationship T1×X=T2×Y+T3×X is satisfied. For example, in the case of X=Y, the relationship T1=T2+T3 is satisfied.

Then, the resist film 3 and the processing film 2 are etched until the top surface of the stepped structure 1A is exposed to the outside. At that time, in the case of X=Y, the resist film 3 and the processing film 2 are etched at the same etch rate. Accordingly, as illustrated in FIG. 1D, the processing film 2 can be embedded onto the bottom surface of the stepped structure 1A while maintaining the flatness of the surface of the processing film 2.

Figure 2:
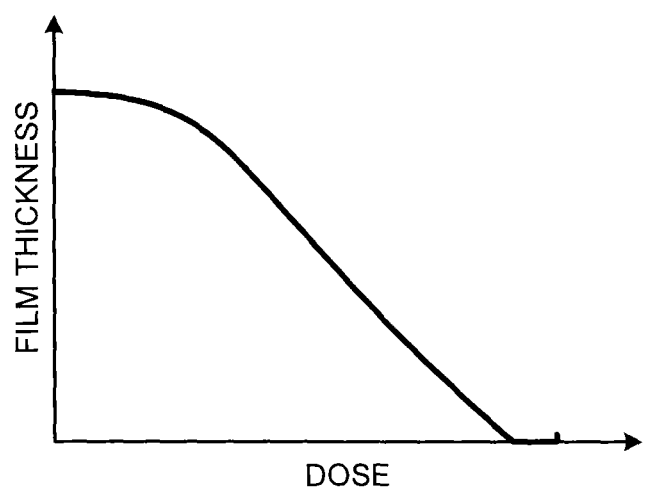
FIG. 2 is a diagram illustrating a relationship between dose and resist film thickness in the process of FIG. 1B.

FIG. 2 is a diagram illustrating a relationship between dose (exposure amount) and resist film thickness in the process of FIG. 1B.

Referring to FIG. 2, the material for the resist film 3 may be selected to keep a proportional relationship between a dose to the resist film 3 and the film thickness of the resist film 3. This makes it possible to improve controllability of film thickness of the resist film 3 with changes in dose.

Second Embodiment

Figure 3:
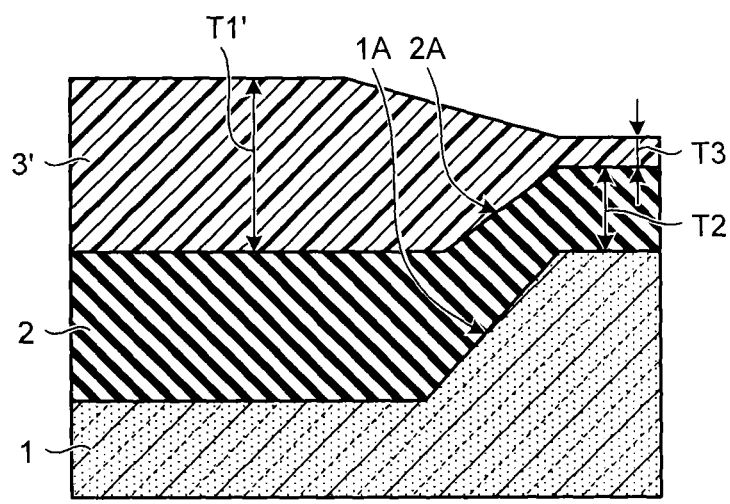
FIG. 3 is a cross-sectional view illustrating a manufacturing method for a semiconductor device according to a second embodiment.

FIG. 3 is a cross-sectional view illustrating a manufacturing method for a semiconductor device according to a second embodiment.

Referring to FIG. 3, a resist film 3' is provided instead of the resist film 3 in FIG. 1C. When the resist film 3' is higher in etch rate than the processing film 2, film thickness T1' of the resist film 3' can satisfy the condition T1'>T2+T3. When the resist film 3' and the processing film 2 are etched until the top surface of the stepped structure 1A is exposed to the outside, the processing film 2 can be flattened by satisfying the relationship T1'×X=T2×Y+T3×X.

The resist film 3' is formed on the processing film 2 in such a manner as to be thinner at a higher portion of the stepped structure 1A than at a lower portion of the same, and then the resist film 3' and the processing film 2 are etched at the same time to flatten the processing film 2. This eliminates the need to add a resist etch-back process separately from the etching process of the processing film 2 for flattening of the processing film 2, thereby resulting in reduction of the number of processes.

Third Embodiment

FIGS. 4A to 6A and 4B to 6B are cross-sectional views illustrating a manufacturing method for a semiconductor device according to a third embodiment. In the third embodiment, an NAND-type flash memory with a three-dimensional array of memory cells is taken as an example of a semiconductor device.

Figure 4A:
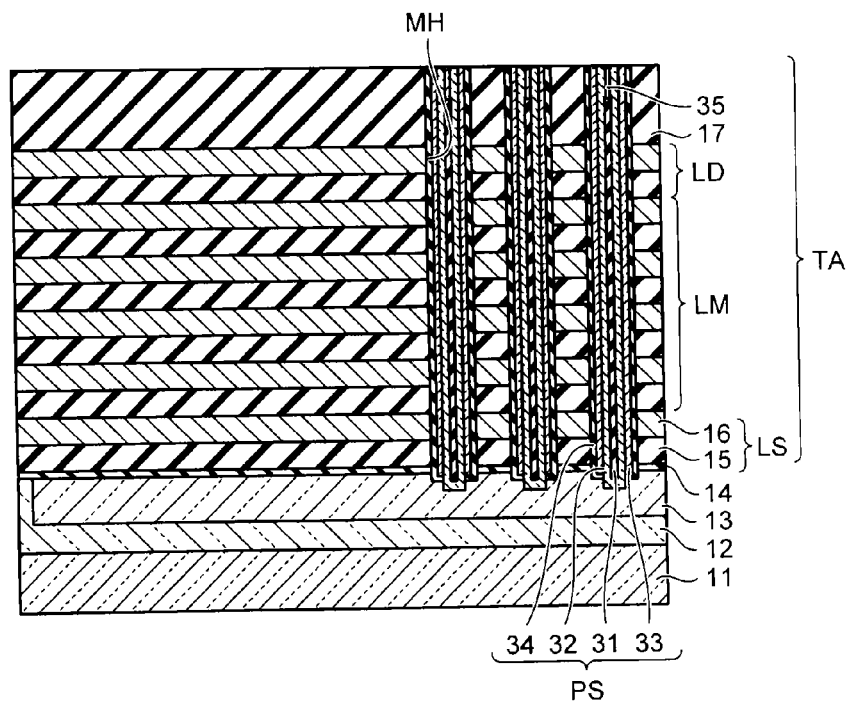
FIGS. 4A and 4B are cross-sectional views illustrating a manufacturing method for a semiconductor device according to a third embodiment.

Referring to FIG. 4A, an N well 12 is formed on a semiconductor substrate 11, and a P well 13 is formed on the N well 12. An insulating film 14 is formed on the P well 13, and a stacked body TA is formed on the insulating film 14. The stacked body TA has an alternate stack of inter-layer insulating films 15 and conductive films 16. In the example of FIG. 4A, six inter-layer insulating films 15 and six conductive films 16 are alternately stacked. An insulating film 17 is formed on the top conductive film 16. The material for the semiconductor substrate 11 may be a semiconductor such as Si, SiGe, or SiC. The material for the insulating films 14 and 17 and the inter-layer insulating films 15 may be $SiO_2$, for example. The material for the conductive film 16 may be an impurity-added polysilicon or a metal such as W, for example. The stacked body TA may be provided with memory cell array layers LM and select transistor layers LS and LD. The select transistor layers LS may be provided under the memory cell array layers LM, and the select transistor layers LD may be provided on the memory cell array layers LM. At that time, the first-layer conductive film 16 may be assigned to the select transistor layer LS, the second- to fifth-layer conductive layers 16 may be assigned to the memory cell array layers LM, and the sixth-layer conductive film 16 may be assigned to the select transistor layer LD.

The stacked body TA has memory holes MH formed in a depth direction. The memory holes MH penetrate through the stacked body TA and reach the P well 13. Columnar bodies PS are embedded into the memory holes MH. In each of the columnar bodies PS, a columnar insulator 31 is formed at the center and a columnar semiconductor 35 is formed on the columnar insulator 31. Semiconductor films 32 and 33 are formed between the inner surface of the memory hole MH and the columnar insulator 31. An insulating film 34 is formed between the inner surface of the memory hole MH and the semiconductor film 33. The semiconductor films 32 and 33 may also be formed around the columnar semiconductor 35. The semiconductor film 32 may be configured to be in contact with the P well 13 and the columnar semiconductor 35, and the semiconductor film 33 may be configured not to be in contact with the P well 13 and the columnar semiconductor 35. In that case, the semiconductor film 32 may serve as a channel layer and the semiconductor film 33 may serve as a body layer. The insulating film 34 may be provided with a tunnel insulating layer, a charge trap layer, and a block insulating layer. The semiconductor films 32, 33 and the columnar semiconductor 35 may be formed from a P-type amorphous silicon, for example. The tunnel insulating layer and the block insulating layer may be formed from silicon dioxide films. The charge trap layer may be a silicon nitride film, an ONO film (three-layer structure of silicon dioxide film/silicon nitride film/silicon dioxide film), or an ONOS film (four-layer structure of silicon dioxide film/silicon nitride film/silicon dioxide film/silicon oxynitride film), for example.

Figure 4B:
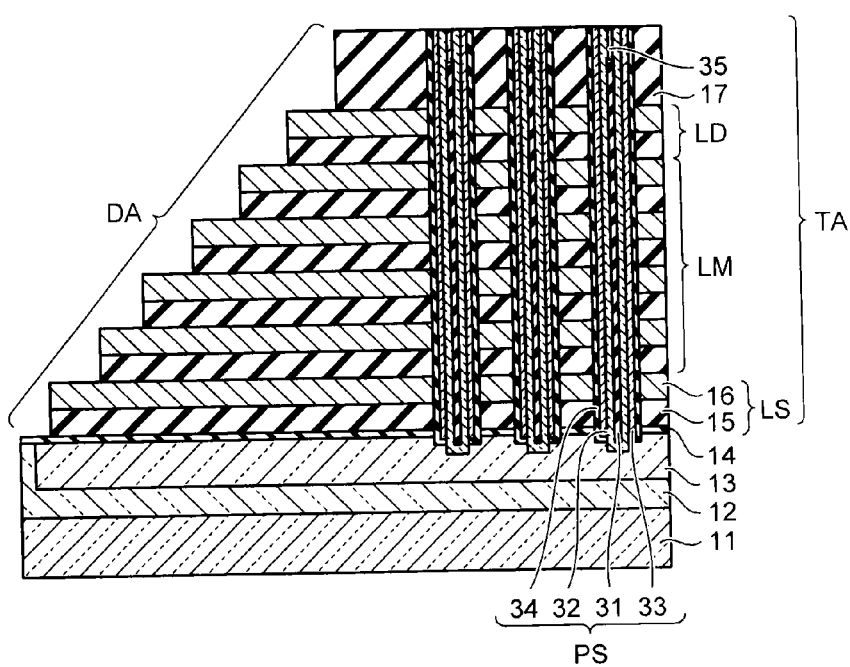

Next, as illustrated in FIG. 4B, steps DA are formed in the stacked body TA such that the upper-layer conductive films 16 and inter-layer insulating films 15 are stepped back from the lower-layer conductive films 16 and inter-layer insulating films 15.

Figure 5A:
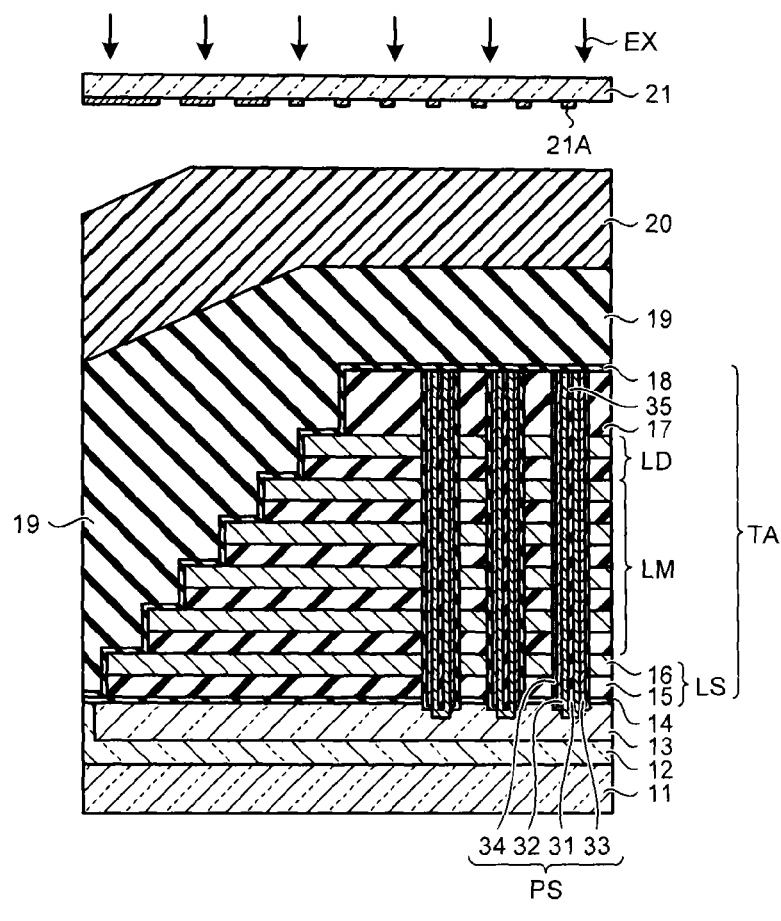
FIGS. 5A and 5B are cross-sectional views illustrating the manufacturing method for a semiconductor device according to the third embodiment.

Next, as illustrated in FIG. 5A, an insulating film 18 is formed along the steps DA by a method such as CVD. Then, an insulating film 19 is deposited on the stacked body TA to cover the steps DA by a method such as CVD. The material for the insulating films 18 and 19 may be $SiO_2$, for example. The insulating film 18 may be formed under film forming conditions with larger step coverage than that for the insulating film 19. The insulating film 19 may be formed under film forming conditions with a more favorable embedding property than that for the insulating film 18. Next, a resist film 20 is applied to the insulating film 19 by a method such as spin coating. Then, the resist film 20 is irradiated with exposure light EX via an exposure mask 21 to provide the resist film 20 with solubility at development. At that time, the resist film 20 may be provided with solubility distribution according to an effective transmission rate distribution of the exposure mask 21. That is, the resist film 20 may be higher in solubility at a portion of the exposure mask 21 with a higher effective transmission rate than at a portion of the exposure mask 21 with a lower effective transmission rate. The exposure mask 21 may be higher in effective transmission rate at higher portions of the steps DA than at lower portions of the same. At that time, the crude density of a light-shielding pattern 21A may be changed according to the effective transmission rate of the exposure mask 21. The crude density of the light-shielding pattern 21A may be provided with a pattern pitch of a resolution limit or less.

Figure 5B:
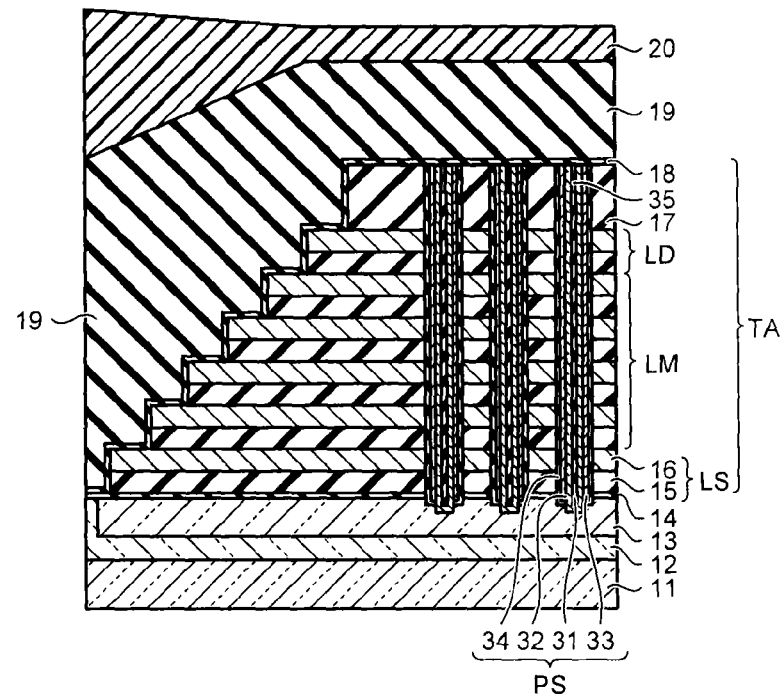
Figure 6A:
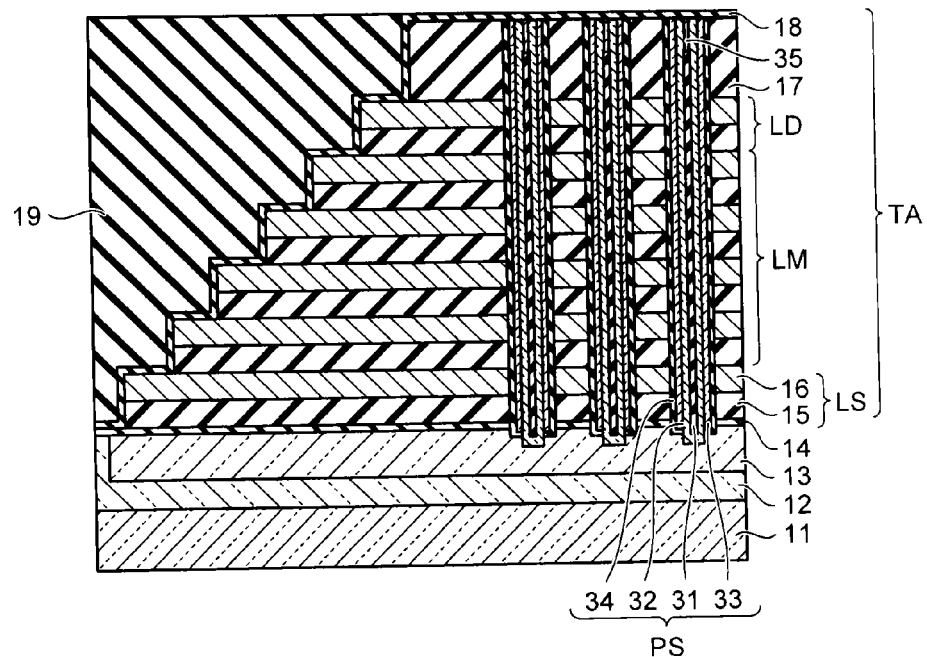
FIGS. 6A and 6B are cross-sectional views illustrating the manufacturing method for a semiconductor device according to the third embodiment.

Next, as illustrated in FIG. 5B, the resist film 20 is developed to dissolve the resist film 20 according to the solubility distribution of the resist film 20. At that time, the film thickness of the resist film 20 may be thinned at the higher portions of the steps DA than at the lower portions of the same. Then, the resist film 20 and the insulating film 19 are etched until the top surface of the steps DA is exposed to the outside. As a result, the insulating film 19 with the flattened surface is embedded onto bottom surfaces of the steps DA as illustrated in FIG. 6A.

Figure 6B:
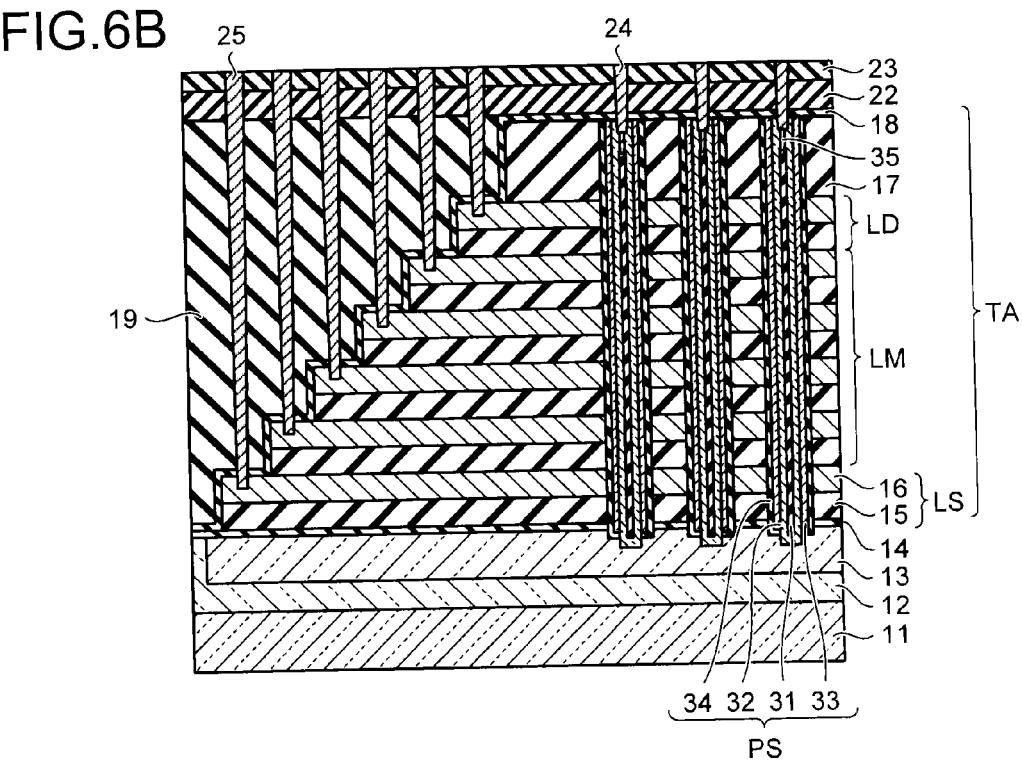

Next, as illustrated in FIG. 6B, an insulating film 22 is formed on the insulating films 18 and 19, and an insulating film 23 is formed on the insulating film 22 by a method such as CVD. Then, contact plug 24 is embedded into the insulating films 22 and 23 in such a manner as to be in contact with the columnar semiconductor 35. Further, contact plug 25 is embedded into the insulating films 22 and 23 in such a manner as to be in contact with each layer of the conductive films 16.

Flattening the surface of the insulating film 19 reduces the wiring pitch while preventing occurrence of a short-circuit between wires formed on the insulating film 19. In addition, flattening the surface of the insulating film 19 eliminates the need to add a resist etch-back process separately from the etching process of the insulating film 19, thereby resulting in reduction of the number of processes.

Fourth Embodiment

Figures 7, 8:
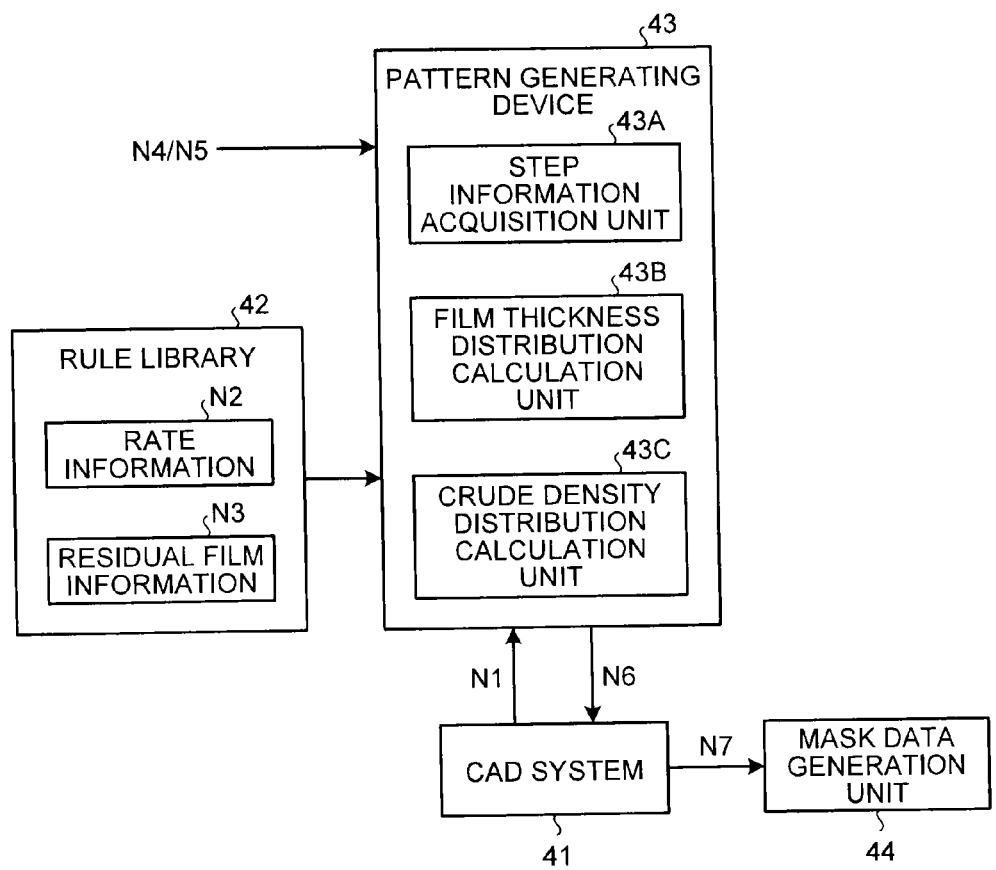
FIG. 7 is a schematic block diagram of a pattern generating device according to a fourth embodiment.
FIG. 8 is a diagram illustrating an example of rate information in FIG. 7.

FIG. 7 is a schematic block diagram of a pattern generating device according to a fourth embodiment.

Referring to FIG. 7, a pattern generating device 43 includes a step information acquisition unit 43A, a film thickness distribution calculation unit 43B, and a crude density distribution calculation unit 43C. A rule library 42 accompanies the pattern generating device 43. The rule library 42 may store rate information N2 and residual film information N3. As peripherals for the pattern generating device 43, a CAD system 41 and a mask data generation unit 44 are provided. The step information acquisition unit 43A acquires step information N4 indicating height differences in the stepped structure 1A. The height differences in the stepped structure 1A may be given by actual measurement values or may be calculated from designed values. The height differences in the stepped structure 1A may be measured by the use of an atomic force microscope (AFM), for example. The film thickness distribution calculation unit 43B calculates a film thickness distribution of the resist film 3 for flattening the processing film 2 covering the stepped structure 1A. The crude density distribution calculation unit 43C calculates a crude density distribution of the light-shielding pattern 4A of the exposure mask 4 corresponding to the film thickness distribution of the resist film 3. The rate information N2 may indicate a relationship between etch rate X of the resist film 3 and etch rate Y of the processing film 2 by each of gas types N5. The residual film information N3 may indicate a relationship between effective transmission rate of the exposure mask 4 and residual film of the resist film 3.

Then, the CAD system 41 generates designed layout data N1 for a semiconductor integrated circuit and sends the same to the pattern generating device 43. The step information acquisition unit 43A acquires the step information N4 for the stepped structure 1A corresponding to a layout pattern specified by the designed layout data N1. The film thickness distribution calculation unit 43B searches for the rate information N2 with the gas type N5 as a key to acquire the etch rate X of the resist film 3 and the etch rate Y of the processing film 2. The film thickness distribution calculation unit 43B then calculates the film thickness distribution of the resist film 3 in such a manner as to allow flattening of the processing film 2 covering the stepped structure 1A, according to the etch rates X and Y and the step information N4. The crude density distribution calculation unit 43C refers to the residual film information N3 to acquire the effective transmission rate distribution of the exposure mask 4 according to the film thickness distribution of the resist film 3, and calculates a crude density distribution N6 of the light-shielding pattern 4A of the exposure mask 4 according to the effective transmission rate distribution. The CAD system 41 changes the layout pattern specified by the designed layout data N1 to acquire the crude density distribution N6 of the light-shielding pattern 4A, and sends designed layout data N7 corresponding to the changed layout pattern to the mask data generation unit 44. The mask data generation unit 44 generates mask data corresponding to the layout pattern specified by the designed layout data N7.

FIG. 8 is a diagram illustrating an example of rate information in FIG. 7.

Referring to FIG. 8, the rate information N2 has gas types G0 to G4 registered as the gas types G, for example, and has relationships between the etch rates X and Y corresponding to the gas types G0 to G4. For example, relationships X=X1 and Y=Y1 are registered at the gas type G0, X=X2 and Y=Y1 are registered at the gas type G1, X=X3 and Y=Y1 are registered at the gas type G2, and X=X4 and Y=Y2 are registered at the gas types G3 and G4.

FIG. 9A is a diagram illustrating an example of residual film information in FIG. 7, and FIG. 9B is a diagram illustrating correspondences between light-shielding patterns and residual resist films, providing effective transmission rates in FIG. 9A.

Referring to FIGS. 9A and 9B, the exposure mask 4 has an effective transmission rate distribution F divided into sections F0 to F4. Residual resist films T are given as T'0 to T'4 according to the effective transmission rate distributions F0 to F4. At the residual film information N3, correspondences between the effective transmission rate distributions F0 to F4 and the residual resist films T'0 to T'4 may be registered.

Figures 10A, 10B:
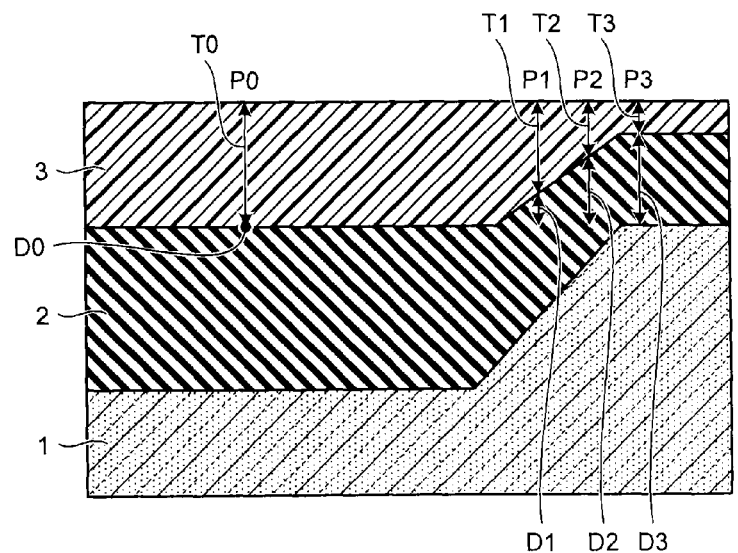
FIG. 10A is a diagram illustrating relationships between resist film thicknesses and foundation steps.
FIG. 10B is a cross-sectional view illustrating positions at which the resist film thicknesses are provided corresponding to the foundation steps in FIG. 10A.

FIG. 10A is a diagram illustrating relationships between resist film thicknesses and foundation steps, and FIG. 10B is a cross-sectional view illustrating positions at which the resist film thicknesses are provided corresponding to the foundation steps in FIG. 10A.

Referring to FIGS. 10A and 10B, positions P of the resist film 3 are given as P0 to P4. Steps D in the processing film 2 are given as D0 to D4 corresponding to the positions P0 to P4 of the resist film 3. At that time, the film thickness distribution calculation unit 43B can calculate the film thicknesses T0 to T4 corresponding to the positions P0 to P4 of the resist film 3.

Figure 11:
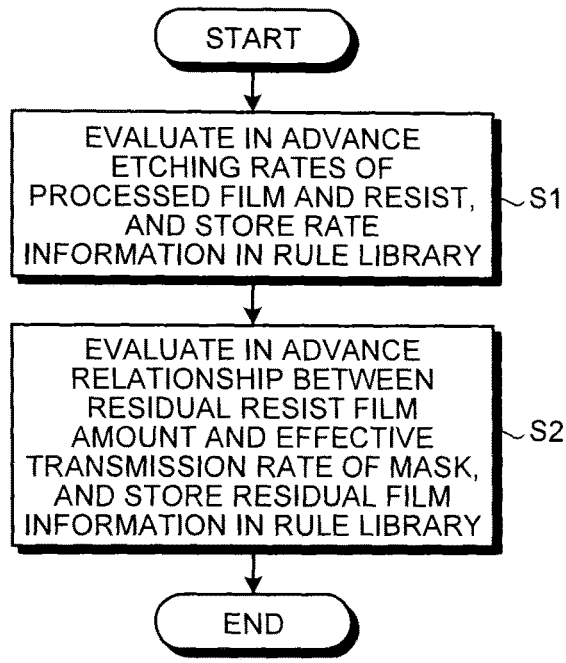
FIG. 11 is a flowchart of a generating method of a rule library in FIG. 7.

FIG. 11 is a flowchart of a generating method for the rule library in FIG. 7.

Referring to FIG. 11, the relationship between the etch rate X of the resist film 3 and the etch rate Y of the processing film 2 are evaluated by each of the gas types N5, and the evaluation results are registered as the rate information N2 in the rule library 42 (S1). Then, the relationships between the effective transmission rate of the exposure mask 4 and the residual film of the resist film 3 are evaluated, and the evaluation results are registered as the residual film information N3 in the rule library 42 (S2).

Figure 12:
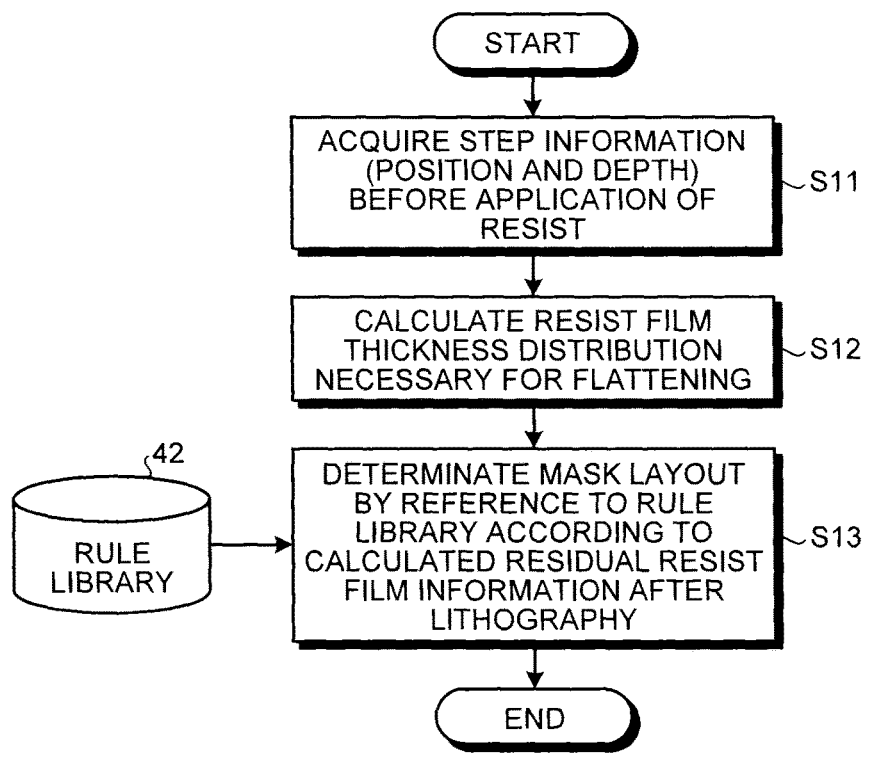
FIG. 12 is a flowchart of operations of the pattern generating device in FIG. 7.

FIG. 12 is a flowchart of operations of the pattern generating device in FIG. 7.

Referring to FIG. 12, the step information N4 indicating height differences in the stepped structure 1A before application of the resist film 3 is acquired (S11). The step information N4 may include the position and depth of the stepped structure 1A. Then, the film thickness distribution of the resist film 3 for flattening the processing film 2 covering the stepped structure 1A is calculated (S12). Then, a mask layout is determined by reference to the rule library 42 according to the film thickness distribution of the resist film 3 after lithography (S13).

Figure 13:
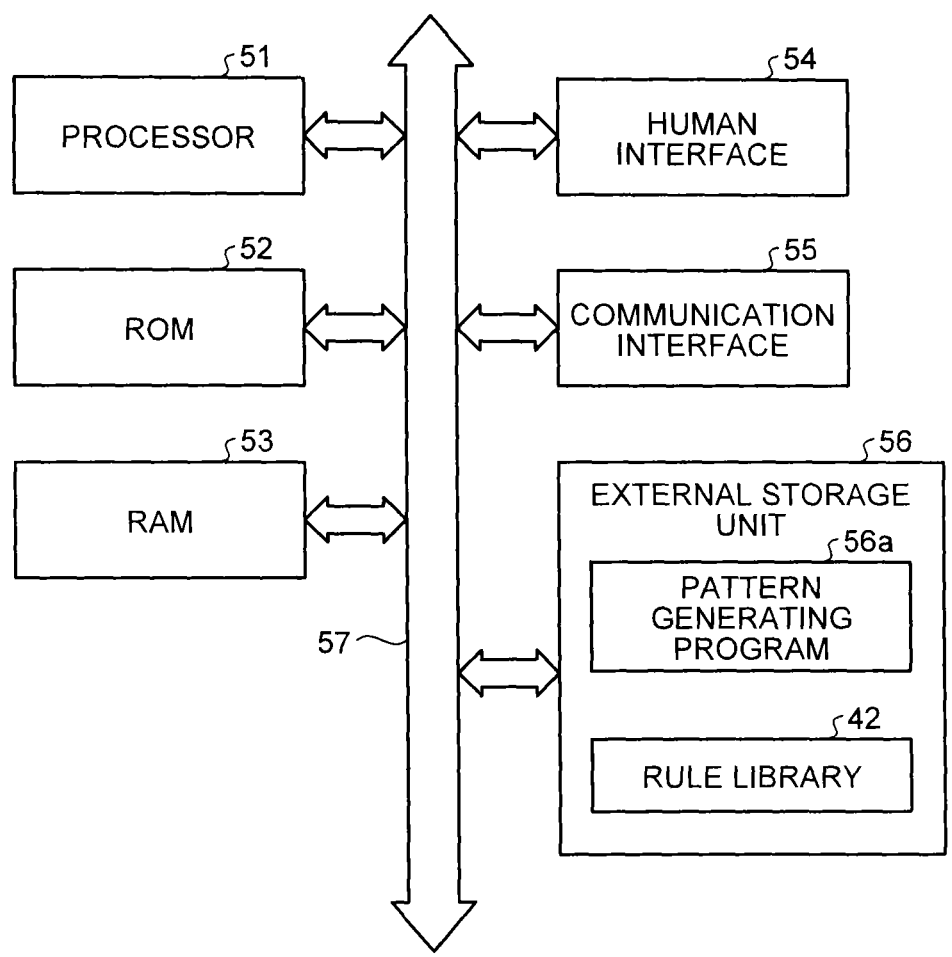
FIG. 13 is a block diagram of a hardware configuration of the pattern generating device in FIG. 7.

FIG. 13 is a block diagram of a hardware configuration of the pattern generating device in FIG. 7.

Referring to FIG. 13, the pattern generating device in FIG. 7 may be provided with a processor 51 including a CPU and the like, a ROM 52 storing fixed data, a RAM 53 providing a work area and the like for the processor 51, a human interface 54 intervening between a human and a computer, a communication interface 55 providing an external communication means, and an external storage unit 56 storing programs and various data for operating the processor 51. The processor 51, the ROM 52, the RAM 53, the human interface 54, the communication interface 55, and the external storage unit 56 are connected together via a bus 57.

The external storage unit 56 may be a magnetic disc such as a hard disc, an optical disc such as a DVD, or a portable semiconductor storage unit such as a USB memory or a memory card. The human interface 54 may be a keyboard, a mouse, or a touch panel as an input interface, and may be a display or a printer as an output interface, for example. The communication interface 55 may be an LAN card, a modem, a router, or the like, for connection with the internet or an LAN. The external storage unit 56 has a pattern generating program 56a installed and the rule library 42 registered therein.

When the pattern generating program 56a is executed by the processor 51, the step information N4 indicating height differences in the stepped structure 1A is acquired, and the film thickness distribution of the resist film 3 for flattening the processing film 2 covering the stepped structure 1A is calculated. Then, a mask layout is determined by reference to the rule library 42 according to the film thickness distribution of the resist film 3.

The pattern generating program 56a to be executed by the processor 51 may be stored in the external storage unit 56 and read into the RAM 53 at execution of the program, or may be stored in advance in the ROM 52, or may be acquired via the communication interface 55. In addition, the pattern generating program 56a may be executed at a standalone computer or a cloud computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing method for a semiconductor device, comprising:
    forming a stepped structure on a semiconductor substrate;
    forming a processing film to cover the stepped structure;
    applying a resist film to the processing film;
    exposing the resist film to light such that the resist film is higher in solubility at a higher portion of the stepped structure than at a lower portion of the same;
    developing the exposed resist film to form a resist film on the processing film in such a manner as to be thinner at the higher portion of the stepped structure than at the lower portion of the same; and
    etching the resist film and the processing film to flatten the processing film.

2. The manufacturing method for a semiconductor device of claim 1, wherein
    the exposing the resist film to light such that the resist film is higher in solubility at the higher portion of the stepped structure than at the lower portion of the same includes exposing the resist film to light via an exposure mask with differences in effective transmission rate according to a height difference in the stepped structure.

3. The manufacturing method for a semiconductor device of claim 2, wherein the exposure mask differs in crude density of a light-shielding pattern according to the effective transmission rate.

4. The manufacturing method for a semiconductor device of claim 3, wherein the crude density of the light-shielding pattern is given with a pattern pitch of a resolution limit or less.

5. The manufacturing method for a semiconductor device of claim 1, wherein a film thickness distribution of the resist film is set such that the processing film is flattened when the processing film is embedded into the lower portion of the stepped structure.

6. The manufacturing method for a semiconductor device of claim 1, wherein
    the stepped structure has word lines and inter-layer insulating films stacked alternately, and
    steps are formed between the word lines such that upper-layer word lines are stepped back from lower-layer word lines.

7. The manufacturing method for a semiconductor device of claim 6, comprising:
    forming contacts on the processing film such that the upper-layer word lines are connected to the lower-layer word lines at stepped-back portions.

8. The manufacturing method for a semiconductor device of claim 7, wherein
    the semiconductor device includes a columnar body penetrating through the stacked word lines, and
    the columnar body includes:
    a central body capable of forming a channel;
    a tunnel insulating film formed on an outer peripheral surface of the central body;
    a charge trap film formed on an outer peripheral surface of the tunnel insulating film; and a block insulating film formed on an outer peripheral surface of the charge trap film.

* * * * *